(12) United States Patent
Langley et al.

(10) Patent No.: US 11,934,504 B2
(45) Date of Patent: Mar. 19, 2024

(54) METHOD OF HOST-DIRECTED ILLUMINATION AND SYSTEM FOR CONDUCTING HOST-DIRECTED ILLUMINATION

(71) Applicant: Daon Technology, Dublin (IE)

(72) Inventors: Richard Jay Langley, Vienna, VA (US); Michael Peirce, Dublin (IE); Nicolas Jacques Jean Sezille, Dundrum (IE)

(73) Assignee: Daon Technology, Dublin (IE)

( * ) Notice: Subject to any disclaimer, the term of this patent is extended or adjusted under 35 U.S.C. 154(b) by 0 days.

(21) Appl. No.: 17/818,500

(22) Filed: Aug. 9, 2022

(65) Prior Publication Data

US 2022/0392266 A1 Dec. 8, 2022

Related U.S. Application Data

(63) Continuation of application No. 17/204,171, filed on Mar. 17, 2021, now Pat. No. 11,462,055, which is a continuation of application No. 16/680,548, filed on Nov. 12, 2019, now Pat. No. 10,984,271, which is a continuation of application No. 16/200,695, filed on Nov. 27, 2018, now Pat. No. 10,503,991, which is a continuation of application No. 15/987,983, filed on (Continued)

(51) Int. Cl.
| | |
|---|---|
| *G06K 9/20* | (2006.01) |
| *G06F 21/32* | (2013.01) |
| *G06V 10/141* | (2022.01) |
| *G06V 40/16* | (2022.01) |
| *G06V 40/40* | (2022.01) |
| *H04L 9/40* | (2022.01) |
| *H04W 12/065* | (2021.01) |
| *H04W 12/12* | (2021.01) |
| *H04W 12/65* | (2021.01) |

(52) U.S. Cl.
CPC ............ *G06F 21/32* (2013.01); *G06V 10/141* (2022.01); *G06V 40/168* (2022.01); *G06V 40/172* (2022.01); *G06V 40/45* (2022.01); *H04L 63/0861* (2013.01); *H04W 12/065* (2021.01); *H04W 12/12* (2013.01); *H04L 63/0853* (2013.01); *H04W 12/65* (2021.01)

(58) Field of Classification Search
CPC ....... G06V 40/45; G06V 40/16–40/179; G06F 21/32; H04L 63/0861
See application file for complete search history.

(56) References Cited

U.S. PATENT DOCUMENTS

2006/0279726 A1* 12/2006 Galambos .............. G06V 40/16 356/6
2007/0019862 A1* 1/2007 Kakiuchi ................ G06V 40/19 382/190

* cited by examiner

*Primary Examiner* — Brian Werner
(74) *Attorney, Agent, or Firm* — Kevin McDermott, Esq.

(57) ABSTRACT

A method of host-directed illumination for verifying the validity of biometric data of a user is provided that includes capturing biometric data from a user with an authentication device during authentication and directing illumination of the biometric data from a host authentication system during the capturing operation. Moreover, the method includes comparing illumination characteristics of the captured biometric data against illumination characteristics expected to result from the directing operation, and determining that the user is a live user when the illumination characteristics of the captured biometric data match the illumination characteristics expected to result from the directing operation.

12 Claims, 3 Drawing Sheets

Related U.S. Application Data

May 24, 2018, now Pat. No. 10,169,672, which is a continuation of application No. 15/472,451, filed on Mar. 29, 2017, now Pat. No. 10,002,302, which is a continuation of application No. 14/922,679, filed on Oct. 26, 2015, now Pat. No. 9,641,523, which is a continuation of application No. 14/287,271, filed on May 27, 2014, now Pat. No. 9,202,120, which is a continuation of application No. 14/012,092, filed on Aug. 28, 2013, now Pat. No. 8,774,472, which is a continuation of application No. 13/209,663, filed on Aug. 15, 2011, now Pat. No. 8,548,207.

| | ILLUMINATION INSTRUCTIONS | — 28 |
|---|---|---|
| 1. | Vary illumination over time | |
| 2. | Project a detectable pattern | |
| 3. | Vary position of illumination | |
| 4. | Alter orientation of biometric data | |
| 5. | Alter configuration of biometric data | |

METHOD OF HOST-DIRECTED ILLUMINATION AND SYSTEM FOR CONDUCTING HOST-DIRECTED ILLUMINATION

CROSS-REFERENCE TO RELATED APPLICATIONS

This is a continuation application of U.S. patent application Ser. No. 17/204,171, filed Mar. 17, 2021, which is a continuation application of U.S. patent application Ser. No. 16/680,548, filed Nov. 12, 2019, now U.S. Pat. No. 10,984,271, issued Apr. 20, 2021, which is a continuation application of U.S. patent application Ser. No. 16/200,695, filed Nov. 27, 2018, now U.S. Pat. No. 10,503,991, issued Dec. 10, 2019, which is a continuation application of U.S. patent application Ser. No. 15/987,983, filed May 24, 2018, now U.S. Pat. No. 10,169,672, issued Jan. 1, 2019, which is a continuation application of U.S. patent application Ser. No. 15/472,451, filed Mar. 29, 2017, now U.S. Pat. No. 10,002,302, issued Jun. 19, 2018, which is a continuation application of U.S. patent application Ser. No. 14/922,679, filed Oct. 26, 2015, now U.S. Pat. No. 9,641,523, issued May 2, 2017, which is a continuation application of U.S. patent application Ser. No. 14/287,271, filed May 27, 2014, now U.S. Pat. No. 9,202,120, issued Dec. 1, 2015, which is a continuation application of U.S. patent application Ser. No. 14/012,092, filed Aug. 28, 2013, now U.S. Pat. No. 8,774,472, issued Jul. 8, 2014, which is a continuation application of U.S. patent application Ser. No. 13/209,663, filed Aug. 15, 2011, now U.S. Pat. No. 8,548,207, issued Oct. 1, 2013, the disclosures of which are incorporated herein by reference.

BACKGROUND OF THE INVENTION

This invention relates generally to methods and systems for verifying the validity of biometric data, and more particularly, to a method of host-directed illumination for verifying the validity of biometric data captured from a user at a remote location and a system for conducting such host-directed illumination.

Typically, during network-based biometric authentication transactions conducted with a user at a remote location, the user requesting authentication provides a claim of identity and biometric data. However, imposters have been known to impersonate users during remotely conducted network-based biometric authentication transactions by providing a false claim of identity supported by fraudulent biometric data in an effort to deceive an authenticating entity into concluding that the imposter is the person they claim to be. Such impersonations are known as spoofing.

Impostors currently use many methods to obtain or create fraudulent biometric data of others that can be submitted during authentication transactions. For facial biometric data imposters have been known to obtain two-dimensional pictures of others, from social networking sites such as Facebook, which can be presented to a camera during authentication to support a false claim of identity. Imposters have also been known to create fraudulent biometric data by making a physical model of a biometric modality, such as a fingerprint using gelatin or a three-dimensional face using a custom mannequin. Moreover, imposters have been known to eavesdrop on networks during legitimate network-based biometric authentication transactions to surreptitiously obtain genuine biometric data of users. The imposters then use the obtained biometric data for playback during fraudulent network-based authentication transactions. Such fraudulent biometric data are known to be difficult to detect using known liveness detection methods. Consequently, accurately conducting network-based biometric authentication transactions with biometric data captured from a user at a remote location depends on verifying the physical presence of the user during the authentication transaction as well as accurately verifying the identity of the user with the captured biometric data. Verifying that the biometric data presented during a network-based biometric authentication transaction conducted at a remote location is from a live person at the remote location, is known as liveness detection or anti-spoofing.

Methods of liveness detection have been known to use structure derived from motion of a biometric modality, such as a face, to distinguish a live user from a photographic image. Other methods have been known to detect sequential images of eyes or eyeblink techniques to determine if face biometric data is from a live user. However, such methods may not detect spoofing attempts that use high definition video playback to present fraudulent biometric data, and therefore do not provide high confidence liveness detection support for entities dependent upon accurate biometric authentication transaction results.

BRIEF DESCRIPTION OF THE INVENTION

In one aspect, a method of host-directed illumination for verifying the validity of biometric data of a user is provided that includes capturing biometric data from a user with an authentication device during authentication, and directing illumination of the biometric data during the capturing operation from a host authentication system. Moreover, the method includes comparing illumination characteristics of the captured biometric data against illumination characteristics expected to result from the directing operation, and determining that the user is a live user when the illumination characteristics of the captured biometric data match the illumination characteristics expected to result from the directing operation.

In another aspect, a computer system for verifying the validity of biometric data presented by a user during authentication transactions is provided. The computer system includes a service provider system associated with a business engaged in controlling access to resources and that contains a data base. The service provider system is configured to control access to resources relating to users enrolled therein and to conduct transactions. Moreover, the computer system includes a host authentication system that includes an authentication database. The host authentication system is configured to communicate with the service provider system over a network, to randomly select instructions stored therein to be executed while capturing biometric data, to store at least enrollment biometric data of a plurality of users, to determine the liveness of a user requesting to conduct a transaction requiring access to the resources stored in the service provider system, and to authenticate users determined to be live users. Furthermore, the computer system includes an authentication device configured to communicate with the service provider system and the host authentication system over the network, to illuminate the biometric modality presented by the user, and to capture biometric authentication data.

The host authentication system is further configured to direct the authentication device to illuminate the presented biometric modality, compare illumination characteristics of captured biometric data against illumination characteristics expected to result from illuminating the presented biometric modality, and determine that the user is a live user when the illumination characteristics of the captured biometric data match the illumination characteristics expected to result from illuminating the presented biometric modality.

In yet another aspect, a computer program recorded on a non-transitory computer-readable recording medium, included in an authentication computer system, for verifying the validity of biometric data presented by a user attempting to conduct a network-based transaction is provided. The computer program causes the authentication computer system to execute at least randomly selecting at least one instruction stored in a host authentication system and transmitting the at least one instruction to an authentication device. Moreover, the computer program causes the authentication computer system to execute the at least one instruction with the authentication device while capturing biometric data from the user with the authentication device. The biometric data is captured as a sequence of photographic images that each include a captured biometric data component and captured illumination characteristics. Furthermore, the computer program causes the authentication computer system to transmit the captured biometric data to the host authentication system, and to compare each of the captured illumination characteristics against corresponding expected illumination characteristics. When the captured illumination characteristics match the corresponding expected illumination characteristic the computer program causes the authentication computer system to determine that the user is a live user.

DETAILED DESCRIPTION OF THE INVENTION

Figures 1, 2:
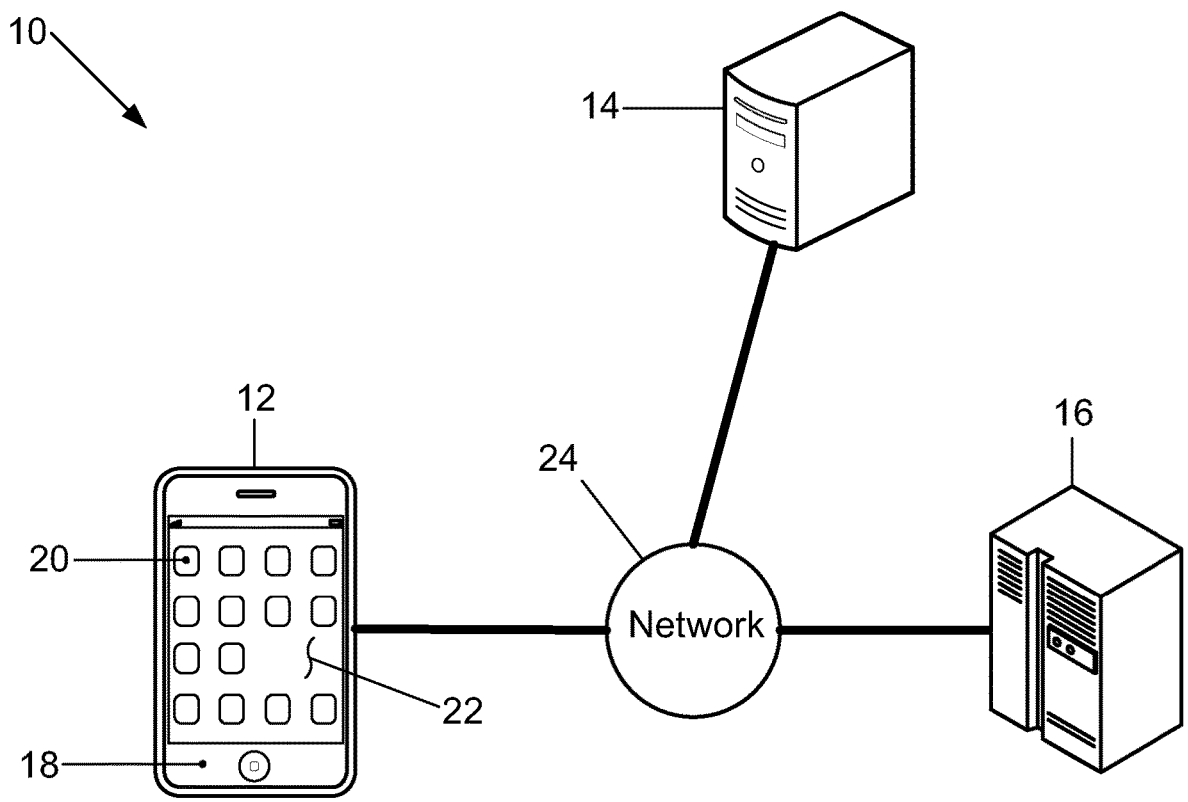
FIG. 1 is a block diagram of an exemplary embodiment of an authentication computer system for verifying the validity of biometric data presented by a user during authentication transactions.
FIG. 2 is a diagram illustrating a listing of exemplary illumination instructions.

FIG. 1 is an expanded block diagram of an exemplary embodiment of a system architecture of an Authentication Computer (AC) System 10 for verifying the validity of biometric data presented by a user during authentication transactions. More specifically, the AC system 10 includes a Remote Authentication (RA) Device 12, a Service Provider (SP) System 14, and a Host Authentication Computer (HAC) System 16.

The RA device 12 is a smart phone that at least stores applications therein, displays at least one of text and images, receives and executes specific instructions regarding illumination during authentication, and captures authentication data from a user. The RA device 12 includes a front face 18, a back face (not shown), at least one camera (not shown), and at least one illumination device (not shown). Each of the front 18 and back faces may include at least one camera. At least one camera (not shown), different from the RA device 12, may also be attached to the RA device 12 such that the attached at least one camera is capable of any type of movement. Moreover, each of the front and back faces may include at least one illumination device arranged in any manner or in any pattern thereon. The at least one illumination device may be any device capable of illuminating biometric data in accordance with illumination instructions as described herein. It should be appreciated that any combination of illumination devices included in the at least one illumination device may be operated at different times to generate different detectable illumination characteristics of a presented biometric modality while capturing biometric data.

The front face 18 includes at least one of buttons and icons 20 for at least entering commands and invoking applications stored in the RA device 12. Furthermore, the front face 18 includes a display screen 22 such as, but not limited to, a Liquid Crystal Display (LCD), that displays at least one of text and images. The display screen 22 may constitute the at least one illumination device. Additionally, the display screen 22 may include the buttons and icons 20. Applications stored in the RA device 12 include at least a security application that causes the RA device 12 to at least operate the at least one illumination device in response to illumination instructions received from the HAC system 16.

Although the RA device 12 is a smart phone, the RA device 12 may alternatively be any device capable of at least displaying at least one of text and images, and capturing and transmitting data. Such other devices include, but are not limited to, a portable cellular phone, a tablet computer, a laptop computer, any type of portable communications device having wireless capabilities such as a personal digital assistant (PDA), and a personal computer.

The RA device 12 is configured to communicate with at least the SP system 14 and the HAC system 16 over a communications network 24. The communications network 24 is a 3G communications network. Alternatively, the communications network 24 may be any wireless network including, but not limited to, Wi-Fi, Global System for Mobile (GSM), Enhanced Data for GSM Evolution (EDGE), and any combination of a local area network (LAN), a wide area network (WAN) and the Internet. Moreover, the RA device 12 is configured to conduct at least long range wireless communications such as cellular telephone calls and to wirelessly access the Internet over the network 24. Furthermore, the RA device 12 may capture authentication data from users and transmit it to the HAC system 16. Alternatively, the RA device 12 may process the captured authentication data prior to transmitting it to the HAC system 16. For example, the RA device 12 may capture biometric authentication data, create a biometric template from the captured data, and then transmit the biometric template to the HAC system 16. The RA device 12 does not permanently store captured authentication data, biometric templates, or any other information that may be derived from captured authentication data.

The SP system 14 is a computer including components such as, but not limited to, a database server, an application server, a directory server, a web server, and a disk storage unit that may be used to store any kind of data. The disk storage unit may store at least one database. The SP system 14 is configured to at least communicate with the RA device 12 and the HAC system 16 over the network 24, and control access to resources. Resources as described herein include anything that may be protected against access by unauthorized users. Consequently, resources may include, but are not limited to, financial accounts, data of any type and of any form, electronic artifacts, services, computer systems, applications, buildings, rooms within buildings, and automobiles.

Electronic artifacts include items such as, but not limited to, web documents. Services include, but are not limited to, checking-out an electronic shopping cart at a website and conducting a payment transaction. Computer systems include, but are not limited to, virtual private networks and such other networks or computer systems running such networks. Applications as described herein are computer programs. For example, applications as described herein may include, but are not limited to, applications that facilitate performing privileged communications and applications that permit access to privileged information. It should be understood that such applications are made available to a user only upon authentication of the identity of the user. Moreover, it should be understood that by virtue of protecting the applications, the functions performed by those applications are also protected. Thus, by virtue of granting access to applications upon authentication of the identity of the user, access is also granted to the functions performed by those applications. Consequently, it should be appreciated that functions caused to be performed on a computer or computer system by applications stored throughout the AC system 10, also constitute resources.

In the exemplary embodiment, the SP system 14 is associated with a financial institution. Thus, the SP system 14 stores and controls access to at least the financial accounts for each of a plurality of financial institution customers and facilitates conducting transactions involving the financial accounts. By virtue of controlling who may access financial accounts, the SP system 14 also facilitates controlling the movement of funds within accounts. Moreover, the SP system 14 stores therein at least biographic data for each customer such that the biographic data of each customer is associated with the financial accounts of the customer as well as a respective service provider user identifier. Biographic data includes any demographic information regarding an individual including, but not limited to, an individual's name, age, date of birth, address, citizenship and marital status. Furthermore, the SP system 14 may store therein policies for at least determining whether a user is authorized to access resources controlled by the SP system 14. As described herein an authorized user is a customer of the financial institution having financial accounts stored in and controlled by the SP system 14. Such users are authorized to access their financial accounts, and conduct transactions involving their financial accounts after being successfully authenticated.

Although the SP system 14 is associated with a financial institution the SP system 14 is in no way limited to being associated with a financial institution. Alternatively, the SP system 14 may be associated with any type of business or entity that controls access to resources. For example, the SP system 14 may be associated with a security service company that facilitates controlling access to buildings. Although the AC system 10 includes one SP system 14 associated with a financial institution, the AC system 10 may alternatively include a plurality of SP systems 14 that are each associated with a different business or entity.

The SP system 14 generally does not include rigorous authentication capabilities. The HAC system 16 is designed to quickly connect to, and provide rigorous authentication capabilities to, operators of the SP system 14. By keeping the HAC system 16 separate from the SP system 14, and accessing the HAC system 16 as a managed service, the operator of the SP system 14 is able to secure rigorous authentication capabilities without purchasing hardware and software to implement such capabilities and without incurring costs associated with training employees to use the HAC system hardware and software. Consequently, the HAC system 16 may facilitate quickly and inexpensively retrofitting the SP system 14 to provide rigorous authentication. The SP system 14 and the HAC system 16 are not the same device or system. Alternatively, the SP system 14 and the HAC system 16 may be the same device or system.

The HAC system 16 includes components such as, but not limited to, a web server, a database server, an application server, a directory server and a disk storage unit that may be used to store any kind of data. The disk storage unit may store at least one database such as, but not limited to, an authentication database. The HAC system 16 also includes a database management server and an authentication server. The database management server may be used to facilitate transferring data to and from the disk storage device. The authentication server performs matching of any feature or information associated with individuals to authenticate the identity of individuals as described herein.

The HAC system 16 is configured to communicate with the RA device 12 and the SP system 14 over the network 24. Moreover, the HAC system 16 may perform functions including, but not limited to, authenticating users, storing at least one authentication policy for determining at least one biometric modality to be used for authentication, storing at least authentication data of each of a plurality of authorized users in a respective enrollment data record, and determining the liveness of a user requesting access to resources controlled by the SP system 14. Although the HAC system 16 is configured to communicate with a single SP system 14 and a single RA device 12, the HAC system 16 may alternatively be configured to communicate with any number of SP systems 14 and any number of RA devices 12.

The authentication data is biometric data that corresponds to any biometric modality desired to be used as the basis of authenticating a user requesting authentication. Such biometric modalities include, but are not limited to, face, finger, iris, and palm, and any combination of face, finger, iris and palm. The biometric data may take any form such as, but not limited to, photographic images. The enrollment data record of each authorized user stored in the HAC system 16 includes at least enrollment biometric data, a unique user identifier, and the service provider user identifier of the respective authorized user. Enrollment biometric data is biometric data obtained from the user during enrollment. The unique user identifier and service provider user identifier are alphanumeric text strings of any length and are different. By virtue of being stored in the same enrollment data record, the enrollment biometric data, the unique user identifier, and the service provider user identifier of each authorized user are associated with each other. Alternatively, such data may be stored in separate records with links to each other. Biographic data may also be included in the enrollment data records.

The HAC system 16 may also perform functions such as, but not limited to, storing a plurality of illumination instructions and expected illumination characteristics, and randomly selecting illumination instructions to be executed while capturing biometric data during authentication transactions. The randomly selected illumination instructions each require executing an action during authentication that effects illumination characteristics of the biometric modality presented for capture as a photographic image. Because each illumination instruction is randomly selected, illumination of the biometric modality during authentication is not known in advance to an imposter and thus appears unpredictable. Consequently, due to the number of different combinations of illumination instructions that may be randomly selected by the HAC system 16, the randomly selected illumination instructions constitute an unpredictable condition injected into biometric authentication transactions by the HAC system 16 that facilitate making it more difficult for imposters to successfully spoof the HAC system 16.

Moreover, the HAC system 16 may perform functions such as, but not limited to, generating illumination characteristics, and recognizing a distinctive pattern of an illumination characteristic generated as a result of executing any of the illumination instructions. An illumination instruction executed while capturing biometric data during authentication generates a captured illumination characteristic (CIC), and an illumination instruction executed while collecting the enrollment biometric data generates an expected illumination characteristic (EIC). The expected illumination characteristic (EIC) is the illumination characteristic expected to be generated as a result of executing the selected illumination instructions while capturing biometric data during authentication. It should be understood that the HAC system 16 may also recognize illumination characteristics in the form of involuntary movements or reactions of a biometric modality generated as a result of applying illumination in accordance with any of the illumination instructions.

Illumination characteristics are generated as a result of illuminating an object. Illumination may reflect off of the object, may be absorbed by the object, create shadows of the object, or create patterns on the object. Such reflection, absorption, shadow, and pattern effects generated as a result of illuminating an object are examples of illumination characteristics. The same type of illumination may react differently when applied to different objects such that the same type of illumination generates different illumination characteristics. For example, the illumination characteristics of a two-dimensional photograph of a user subjected to a given illumination are different than those of a three-dimensional face of the user subjected to the same illumination. Thus, it should be understood that a two-dimensional photograph used by an imposter attempting to spoof a facial biometric authentication system may be distinguished from the expected presence of three-dimensional face biometric data using the illumination characteristics generated by the same illumination applied to each.

Moreover, illumination may cause involuntary movements or reactions in a presented biometric modality. Such involuntary movements or reactions of a presented biometric modality are also considered illumination characteristics. For example, when a live iris is the biometric modality required for biometric authentication, increasing or decreasing the illumination applied to the live iris generally causes involuntary constriction or dilation, respectively, of the pupil. When the same increase or decrease in illumination is applied to a two-dimensional photograph of an iris, the pupil will not involuntarily constrict or dilate like a live iris. Thus, a two-dimensional photograph used by an imposter attempting to spoof an iris based biometric authentication system may be proven fraudulent. Consequently, it should be understood that controlling illumination of biometric modality data presented during authentication facilitates detecting illumination characteristic differences that may be used to determine the liveness of the user.

The HAC system 16 may also use differences in illumination characteristics to determine the liveness of a user. For example, the HAC system 16 may determine the CICs and EICs of captured biometric data, and compare the CICs against the EICs to determine whether they match. When the CICs and the EICs match, a user is determined to be live. Alternatively, the HAC system 16 may determine the difference between sequential CICs and the difference between sequential EICs, and compare corresponding differences of the CICs and EICs to ensure that temporal changes of the CICs agree with those of the EICs. Thus, it should be understood that the HAC system 16 may compare temporal changes in the CICs against temporal changes in the EICs to ensure that temporal changes of the CICs agree with those of the EICs. When the temporal changes of the CICs agree with those of the EICs, a user is determined to be live. It should be appreciated that the HAC system 16 may determine the illumination characteristics in any manner and may compare the illumination characteristics in any manner that facilitates determining the liveness of a user.

The RA device 12, the SP system 14 and the HAC system 16, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the RA device 12, the SP system 14, and the HAC system 16. The above examples are exemplary only, and are thus not intended to limit in any way the definition and/or meaning of the term "processor."

The respective memories (not shown) in the RA device 12, the SP system 14, and the HAC system 16 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the RA device 12, the SP system 14, and the HAC system 16. Moreover, each of the respective memories (not shown) can be a computer-readable recording medium used to store computer programs or executable instructions that are executed, respectively, by the RA device 12, the SP system 14, and the HAC system 16. Moreover, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

FIG. 2 is a diagram illustrating a listing 26 of exemplary illumination instructions 28 stored in the HAC system 16. Any one of the illumination instructions 28, or any combination of the illumination instructions 28, may be randomly selected by the HAC system 16 to be executed while capturing biometric data during authentication. Varying the illumination intensity or spectrum applied to a presented biometric modality over time while generating a sequence of photographic images or a video sequence facilitates determining the liveness of a user during authentication. Consequently, each of the illumination instructions 28 is designed to vary the illumination applied to a presented biometric modality, and may also be designed to vary the applied illumination over time.

The listing 26 includes a first instruction 28 for varying illumination over time that may be implemented by turning the at least one illumination device on or off while taking the sequence of photographic images, or controlling the at least one illumination device across a continuous range of intensities or different wavelengths while taking the sequence of photographic images. For example, the first instruction may be implemented by illuminating presented biometric data using wavelengths corresponding to any color in the visible spectrum such as, but not limited to, red, blue, or green. Alternatively, wavelengths corresponding to illumination outside the visible spectrum may be used such as, but not limited to, near infra-red light, infra-red light, and ultraviolet light. It should be appreciated that light outside the visible spectrum could be captured by the RA device 12 when capturing biometric data without the user knowing that the light has been projected on the presented biometric modality data.

Moreover, the listing 26 includes a second instruction 28 for causing the at least one illumination device to project a detectable pattern onto a presented biometric modality while taking the sequence of photographic images. The detectable pattern is similar to those projected by near infrared illuminators associated with autofocus camera systems to assist in focusing the camera under low light conditions. The detectable pattern instruction may also cause the at least one illumination device to project any other patterns, or sequences of patterns over time, while taking the sequence of photographic images. It should be appreciated that projecting a detectable pattern onto a presented biometric modality while capturing a sequence of photographic images facilitates detecting curvature in an illuminated surface of the presented biometric modality, which may be used to facilitate detecting the liveness of a user at a remote location.

Furthermore, the listing 26 includes a third instruction 28 for varying the position of illumination with respect to the presented biometric modality over time. The third instruction may include physically moving the at least one illumination device with respect to the presented biometric modality while taking the photographic images. The third instruction may be repeatedly implemented to generate a sequence of photographic images, each taken with the at least one illumination device in a different position. Alternatively, the third instruction may include activating, simultaneously or alternately, illumination devices not included in the RA device 12, that are located at different positions relative to the biometric modality while taking the photographic images. Moreover, a camera attached to the RA device 12 may be moved independently of the RA device 12 to vary the positions of illumination with respect to the presented biometric modality.

Additionally, the listing 26 includes a fourth instruction 28 for altering the orientation of the presented biometric modality. Such an instruction is an indirect method of changing the illumination of the biometric modality being captured, as it alters the relative position of the biometric modality and incidental sources of ambient illumination that may be present during authentication. For example, instructions that require altering an orientation of a presented biometric modality over time may require the user to alter his facial orientation in each photographic image while biometric data of his face is captured in a sequence of photographic images. Such facial orientations include voluntary movements such as, but not limited to, turning the head to the right, turning the head to the left, looking up, and looking down. Alternatively, the fourth instruction may require altering the orientation of the presented biometric modality by moving the presented biometric modality data relative to the at least one illumination device. For example, the presented biometric modality data may be moved from a first to a second position relative to the at least one illumination device.

It should be understood that while altering the orientation of the presented biometric modality movement of an illuminated region on the presented biometric modality may be tracked. The behavior of the illuminated region on a three-dimensional moving object is different than the behavior on a two-dimensional moving object. In addition, the behavior of an illumination region on a human body will be different than the behavior on an artificial model constructed of different materials. Consequently, instructions which alter the orientation of the presented biometric modality facilitate detecting liveness of a user at a remote location.

The listing 26 also includes a fifth instruction that requires altering the configuration of the presented biometric modality over time. The fifth instruction is also an indirect method of changing the illumination of the biometric modality being captured because it requires altering the presented biometric modality data over time. For example, the fifth instruction may require a user to alter a facial expression in each photographic image while biometric data of his face is captured in a sequence of photographic images. Such facial expressions include, but are not limited to, frowning, smiling, and winking an eye. Alternatively, when fingerprints are the biometric modality to be used for authentication, the fifth instruction might require the user to alter the configuration of fingerprints by requiring the user to submit specific fingers, such as the middle and index fingers of the right hand, for capture during authentication. Moreover, the fifth instruction might require the user to alter the presentation of the fingers by spreading or joining some or all of the fingers.

The first, second, and third instructions are referred to herein as direct instructions, and the fourth and fifth instructions are referred to herein as indirect instructions. Direct instructions are illumination instructions executed by the RA device 12 while biometric authentication data is captured with the RA device 12. Indirect instructions are illumination instructions communicated to the user by the RA device 12 that are expected to be executed by the user while biometric data is captured with the RA device 12. Direct instructions are considered to implement direct control of illumination by the HAC system 16, while indirect instructions are considered to implement indirect control by the HAC system 16 because they depend on the user to orient or configure the presented biometric modality data while capturing biometric data.

It should be understood that each of the illumination instructions 28 may be repeatedly executed, or may be executed in combination with any other illumination instruction 28 during authentication to generate a sequence of photographic images. For example, the at least one illumination device may be repeatedly repositioned during authentication such that the position of the at least one illumination device with respect to the presented biometric modality varies over time, while the at least one illumination device is on in some positions and off in other positions. As described herein, each of the sequence of photographic images is captured while executing at least one illumination instruction 28. Although the listing 26 includes five illumination instructions, any number of illumination instructions may alternatively be included in the listing 26.

Figure 3:
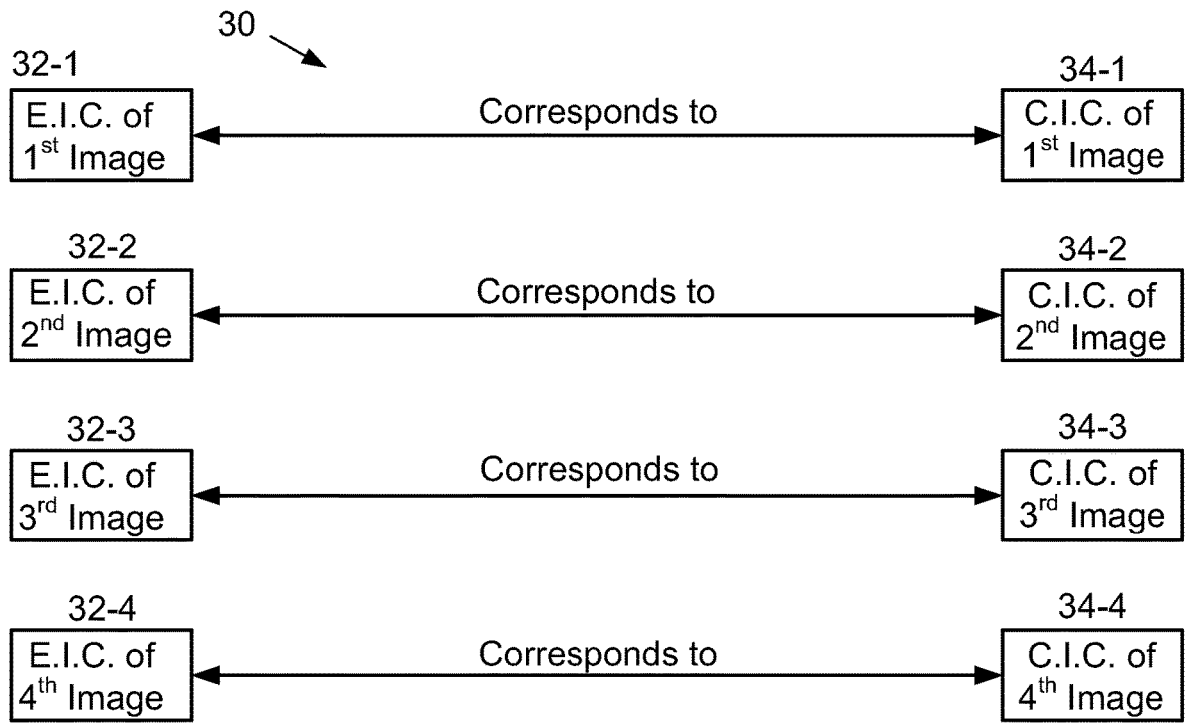
FIG. 3 is a diagram illustrating expected illumination characteristics and corresponding captured illumination characteristics.

FIG. 3 is a diagram 30 illustrating EICs 32-1 to 32-4 and corresponding CICs 34-1 to 34-4 for a sequence of four photographic images captured over time during authentication. Corresponding illumination characteristics of each photographic image may be compared to determine the liveness of a user. For example, the EIC 32-1 for a first photographic image may be compared against the CIC 34-1 of the first photographic image. When a difference between the corresponding illumination characteristics 32-1 and 34-1 is within an acceptable tolerance, the EIC 32-1 is considered to match the CIC 34-1. When the corresponding illumination for each image in the sequence matches within an acceptable tolerance the user is determined to be live. Alternatively the corresponding illumination characteristics CIC, EIC of any number of images may be required to match in order to determine that a user is live. For example, the corresponding illumination characteristics CIC, EIC of three out of four images may be required to match within the expected tolerance to determine that a user is live.

As yet another alternative for determining whether a user is live, matching scores generated as a result of comparing the corresponding illumination characteristics for all of the images may be combined into a single cumulative matching score for comparison against an overall threshold score. When the single cumulative matching score is at least equal to the threshold score, the user is determined to be live. In view of the above, it should be understood that the corresponding illumination characteristics CIC, EIC may be manipulated in any manner or scheme, and that any summarizing technique may be used to determine the liveness of a user. Although a sequence of four photographic images is included in the diagram 30, the sequence may alternatively include any number of photographic images.

The information shown in FIG. 4 includes the same information shown in FIG. 3, as described in more detail below. As such, information illustrated in FIG. 4 that is identical to information illustrated in FIG. 3 is identified using the same reference numerals used in FIG. 3.

Figure 4:
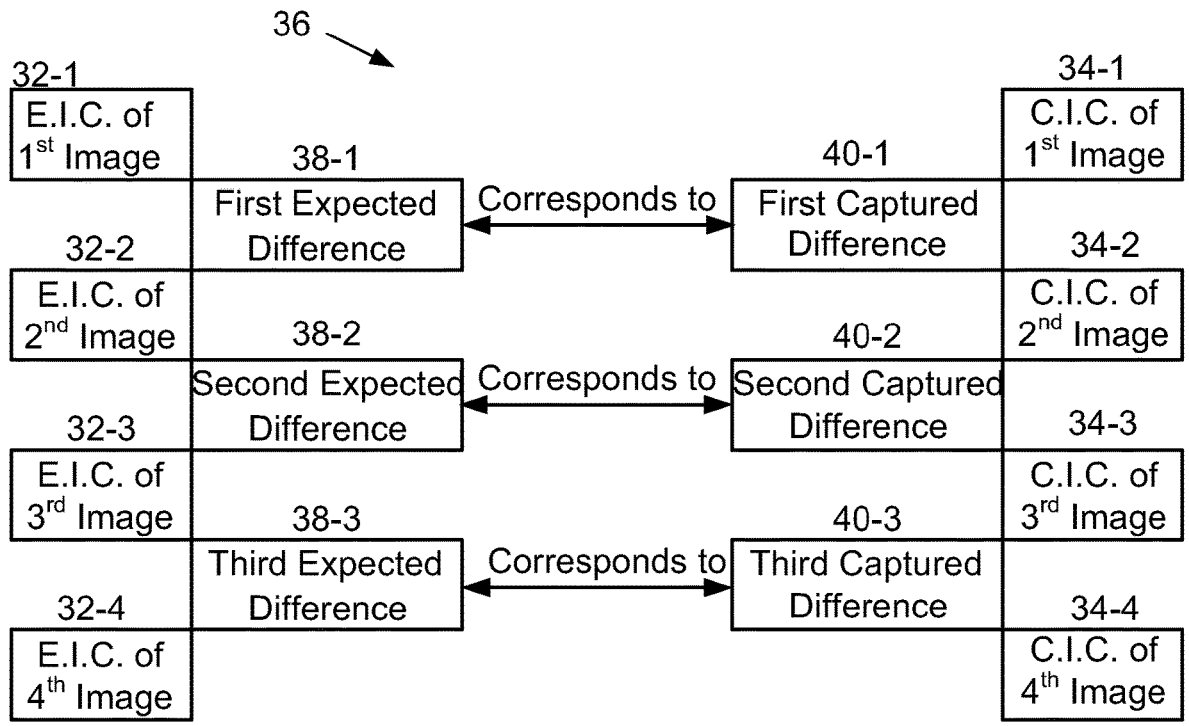
FIG. 4 is a diagram illustrating the expected illumination characteristics and the corresponding captured illumination characteristics shown in FIG. 3, as well as differences between sequential expected illumination characteristics and between sequential captured illumination characteristics.

FIG. 4 is a diagram 36 illustrating the EICs 32-1 to 32-4 and corresponding CICs 34-1 to 34-4 for the sequence of four photographic images captured over time during authentication. This diagram 36 is similar to that shown in FIG. 3. However, differences between sequential EICs 32-1 to 32-4, and differences between sequential CICs 34-1 to 34-4 are included. Specifically, a first expected difference 38-1 is determined between EICs 32-1 and 32-2, a second expected difference 38-2 is determined between EICs 32-2 and 32-3, and a third expected difference 38-3 is determined between EICs 32-3 and 32-4. Moreover, a first captured difference 40-1 is determined between CICs 34-1 and 34-2, a second captured difference 40-2 is determined between CICs 34-2 and 34-3, and a third captured difference 40-3 is determined between CICs 34-3 and 34-4. The first 38-1, second 38-2, and third 38-3 expected differences correspond to the first 40-1, second 40-2, and the third 40-3 captured differences. Corresponding differences are compared to ensure that temporal changes of the CICs 34-1 to 34-4 agree with those of the EICs 32-1 to 32-4, respectively. For example, the second expected difference 38-2 may be compared against the second captured difference 40-2 to determine whether the difference between them is within an acceptable tolerance. When the difference between the differences 38-2 and 40-2 is within the acceptable tolerance, illumination characteristics are determined to match. When all of the corresponding differences match the user being authenticated is determined to be a live user.

Alternatively, any number of the expected differences 38-1 to 38-3 may be compared against corresponding captured differences 40-1 to 40-3 to determine that a user is live. For example, three out of four corresponding differences may be required to match within the expected tolerance to determine that a user is live. As another alternative for determining whether a user is live, matching scores generated as a result of comparing any number of corresponding differences may be combined into one cumulative matching score and compared against an overall difference threshold score. When the one cumulative matching score is at least equal to the overall difference threshold score, the user is determined to be live. In view of the above, it should be understood that the corresponding differences may be manipulated in any manner or scheme, and that any summarizing technique may be used to determine that a user is live.

Figure 5:
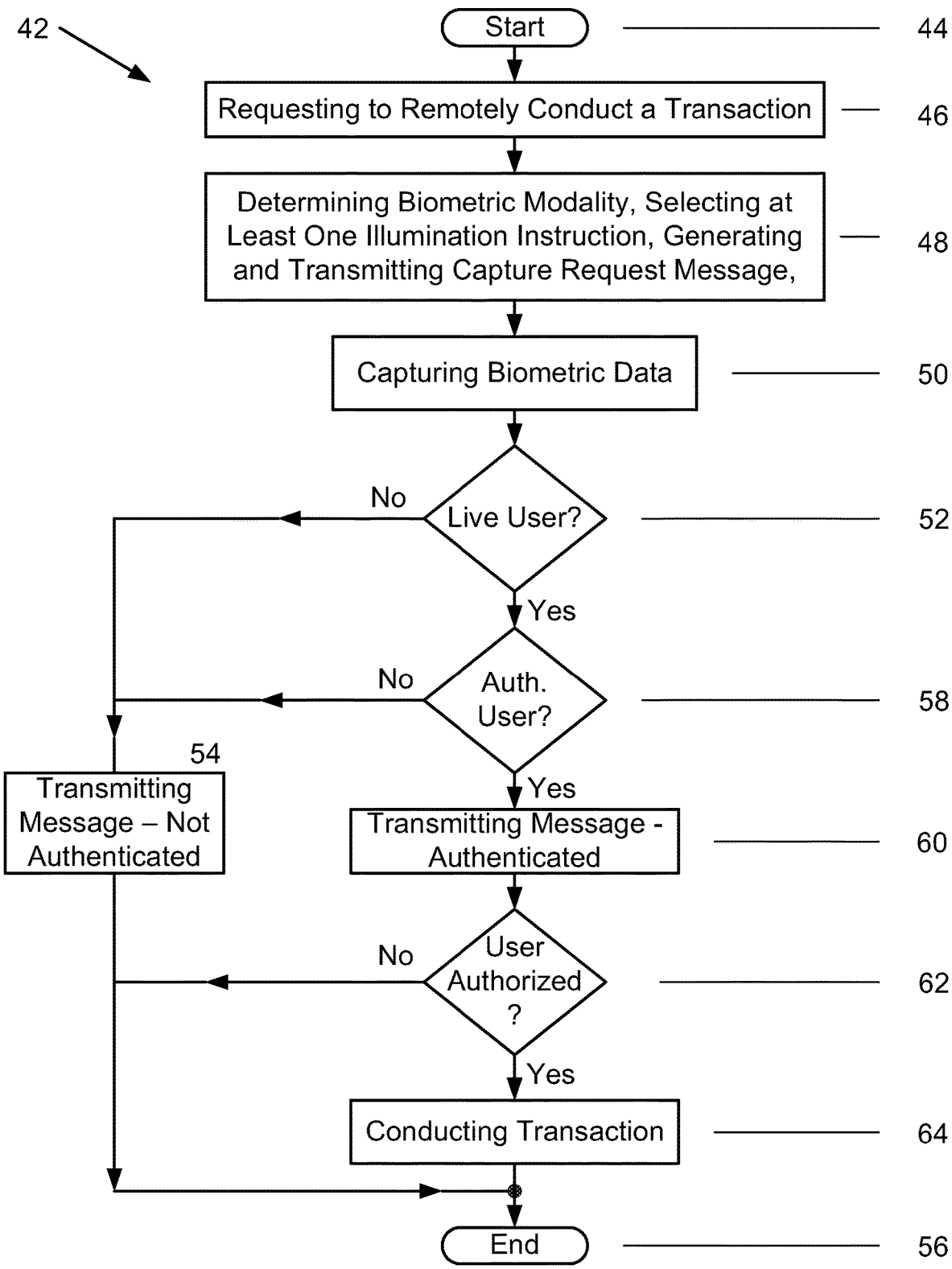
FIG. 5 is a flowchart illustrating an exemplary process for verifying the validity of biometric data of a user.

FIG. 5 is a flowchart 42 illustrating an exemplary process used by the AC system 10 for verifying the validity of biometric data of a user requesting to conduct a network-based transaction that requires accessing at least one resource controlled by the SP system 14 from a remote location. For the AC system 10 the process starts 44 with a user of the RA device 12 requesting 46 to remotely conduct a transaction that requires accessing at least one resource controlled by the SP system 14. In response, the SP system 14 continues processing by transmitting an authentication request message to the HAC system 16. The authentication request message includes at least the service provider user identifier of the requesting user. Next, the HAC system 16 continues processing by determining 48 a biometric modality to be captured during authentication, randomly selecting 48 at least one illumination instruction for capturing biometric data during authentication, generating 48 a capture request message that includes at least the determined biometric modality and the selected at least one illumination instruction, and transmitting 48 the capture request message to the RA device 12. The selected at least one illumination instruction may include one or more direct instructions, one or more indirect instructions, or any combination of direct and indirect instructions. It should be appreciated that by virtue of randomly selecting the at least one illumination instruction to be executed while capturing biometric data from a user with the RA device 12, the HAC system 16 continues processing by directing illumination of the biometric data while capturing the biometric data from a user.

After receiving the capture request message, the RA device 12 continues by displaying the biometric modality to be captured on the screen 22, and by notifying the user of any indirect instructions included in the selected at least one illumination instruction. In the exemplary embodiment the RA device 12 notifies the user of any indirect instructions by displaying them on the screen 22 for the user to see. Next, the requesting user continues by reading the screen 22 and capturing biometric data 50 corresponding to the determined biometric modality with the RA device 12. When indirect instructions are also displayed on the screen 22, the user captures the biometric data while executing the indirect instructions.

It should be understood that in the exemplary embodiment biometric data is captured as a plurality of sequential photographic images, and that as the user captures the biometric data with the RA device 12 the user executes the indirect instructions included in the selected at least one illumination instruction and the security application causes the RA device 12 to execute the direct instructions included in the selected at least one illumination instruction. Thus, biometric data of the determined biometric modality is captured in accordance with the selected at least one illumination instruction. Each of the sequential photographic images included in the captured biometric data includes a captured biometric data component and captured illumination characteristics superimposed thereon. It should be appreciated that each of the captured biometric data components and each of the captured illumination characteristics can be varied over time such that each image in the sequence has different illumination characteristics. Next, the RA device 12 continues processing by transmitting the captured biometric data to the HAC system 16.

After receiving the captured biometric data, the HAC system 16 continues processing by determining whether the requesting user is a live user 52 by comparing the illumination characteristics (CICs) of the captured biometric data against the illumination characteristics (EICs) expected to result from directing the illumination of the biometric data. More specifically, the HAC system 16 continues by determining the first 38-1, second 38-2, and third 38-3 expected differences, and separating the captured biometric data component from the CICs in each photographic image to determine the first 40-1, second 40-2, and third 40-3 captured differences. After determining the expected and captured differences, the HAC system 16 continues by comparing the first expected difference 38-1 against the first captured difference 40-1, the second expected difference 38-2 against the second captured difference 40-2, and the third expected difference 38-3 against the third captured difference 40-3. When the result of each comparison is determined to constitute a match, the requesting user is determined to be a live user. When the result of each comparison does not constitute a match, the requesting user is determined to be an imposter and the HAC system 16 continues processing by transmitting a message 54 to the SP system 14 indicating the user is an imposter and is not authenticated. Next, processing ends 56.

After determining that the requesting user is a live user 52, the HAC system 16 continues processing by authenticating the requesting user 58 by comparing the enrollment biometric data of the requesting user against each of the captured biometric data components. When the enrollment biometric data matches each of the captured biometric data components, the requesting user is successfully authenticated 58.

After successfully authenticating the requesting user 58, the HAC system 16 continues processing by transmitting a message 60 to the SP system 14 indicating the requesting user has been successfully authenticated. In response, the SP system 14 continues by determining whether the requesting user is authorized 62 to conduct the requested transaction. When the requesting user is authorized, processing continues by permitting the user to conduct the transaction 64. Next, processing ends 56. However, when the enrollment biometric data does not match each of the captured biometric data components the requesting user is not successfully authenticated 58, and the HAC system 16 continues processing by transmitting a message 54 to the SP system 14 indicating that the requesting user has not been authenticated. Next, processing ends 56.

Because the selected at least one illumination instruction is executed in response to a communication from the HAC system 16, the HAC system 16 directs application of the selected at least one illumination instruction in the exemplary embodiment. Thus, the process of verifying the validity of biometric data described in the exemplary embodiment is a method of verifying the validity of biometric data using host-directed illumination, where the HAC system 16 is the host directing illumination of a presented biometric modality through the selected at least one illumination instruction. Moreover, because the selected at least one illumination instruction may be executed by the RA device 12 in response to the communication from the HAC system 16, the HAC system 16 effectively directs the RA device 12 to illuminate biometric modality data presented during authentication.

Although the HAC system 16 determines the liveness of a requesting user based on expected differences 38-1, 38-2, 38-3 and captured differences 40-1, 40-2, 40-3 in the exemplary embodiment, in other embodiments the liveness of a requesting user may be determined in any manner that facilitates determining the liveness of a user including, but not limited to, based on direct comparisons of the EICs 32-1, 32-2, 32-3 against corresponding CICs 34-1, 34-2, 34-3.

Although the requesting user is biometrically authenticated in the exemplary embodiment when the enrollment biometric data matches each of the captured biometric data components, in other embodiments the enrollment biometric data need not match each of the captured biometric data components to successfully authenticate the requesting user. For example, three of four captured biometric data components may be required to match the enrollment biometric data and successfully authenticate the requesting user. Moreover, in such other embodiments any method may be used to biometrically authenticate users that is based on the enrollment biometric data and the captured biometric data components.

Although the RA device 12 notifies the user of any indirect instructions included in the selected at least one illumination instruction by displaying the indirect instructions on the screen 22 in the exemplary embodiment, in other embodiments the RA device 12 may notify the user of the indirect instructions in any manner including, but not limited to, voice instructions. Moreover, although the HAC system 16 transmits a capture request message including the selected at least one illumination instruction to the RA device 12 in the exemplary embodiment, in other embodiments the HAC system 16 may transmit a plurality of capture requests each including one illumination instruction to be executed while capturing a corresponding one of the photographic images included in the sequence of photographic images. In such other embodiments, the HAC system 16 transmits each of the capture requests prior to capturing the corresponding one of the photographic images.

Although the SP system 14 determines whether the requesting user is authorized to conduct the requested transaction after the user is successfully biometrically authenticated in the exemplary embodiment, in other embodiments the SP system 14 may make this determination before transmitting the authentication request message to the HAC system 16. In yet other embodiments, the HAC system 16 may determine whether the authenticated user is authorized to conduct the requested transaction instead of the SP system 14.

Although the RA device 12 receives and executes the selected at least one illumination instruction in the exemplary embodiment, in alternative embodiments the RA device 12 may not execute the selected at least one illumination instruction. Instead, any device different than the RA device that is capable of receiving and executing the selected at least one illumination instruction may receive and execute the selected at least one illumination instruction. Such different devices include, but are not limited to, lamps.

Although the exemplary embodiment describes verifying the validity of biometric data of a user using the RA device 12 at a location remote from the SP system 14 and the HAC system 16, in other embodiments the user may be located in close proximity to at least one of the SP system 14 and the HAC system 16. The exemplary embodiment describes operations performed by, and communications sent between, the RA device 12, the SP system 14, and the HAC system 16 that facilitate determining whether a user should be permitted to conduct a requested transaction. In other embodiments the operations may be performed, and the communications may be sent, in any order that facilitates determining whether a user should be permitted to conduct a requested transaction.

The exemplary authentication process starts when a user of the RA device 12 requests to remotely conduct a transaction that requires accessing at least one resource controlled by the SP system 14. However, it should be appreciated that in other embodiments the authentication process may start when the user makes the request from his home personal computer while in possession of the RA device 12. In such other embodiments the SP system 14 communicates with the personal computer over a first communications channel and the HAC system 16 communicates with the RA device over a second communications channel different than the first communications channel. Thus, in such other embodiments out of band communications may be conducted between the user's personal computer and the SP system 14, and the user's RA device 14 and the HAC system 16. Such out of band communications facilitate increasing the security of network-based transactions.

It should be understood that by virtue of providing illumination instructions that are executed while capturing biometric data during authentication, the HAC system 16 is enabled to control and direct specific aspects of authentication in a seemingly unpredictable manner to a user that facilitate determining liveness of the user. As a result of the unpredictable nature of HAC system control, successful spoofing of authentication systems is facilitated to be reduced.

The processes and systems described herein facilitate increasing the level of trust in biometric authentication transaction results determined with biometric data captured at a remote location, and are believed to be applicable to many different businesses for reducing risks that transactions conducted as a result of a successful authentication will be conducted fraudulently.

In each embodiment, the above-described processes reduce the risks that transactions will be conducted fraudulently, and thus facilitate enhancing security of systems and resources involved in conducting such transactions. In exemplary embodiments described herein, biometric data is captured from a user at a remote location in accordance with selected illumination instructions transmitted from a host authentication computer system. Each of the selected illumination instructions requires executing an action during authentication that effects illumination characteristics of a biometric modality presented for capture in a sequence of photographic images. The selected illumination instructions are executed by at least one of a remote authentication device and the user while the biometric data is captured by the user. The host authentication computer system determines whether the captured biometric data was captured from a live user by separating a biometric data component from captured illumination characteristics included in each of the photographic images, generating illumination characteristics for each photographic image expected to result from capturing the biometric data, and comparing the captured illumination characteristics against the expected illumination characteristics for each image. When the captured illumination characteristics match the expected illumination characteristics for each photographic image, the user is determined to be live. The user is authenticated and after being determined to be an authorized user is permitted to conduct a requested transaction.

Exemplary embodiments of authentication processes and systems that provide rigorous liveness detection support are described above in detail. The processes are not limited to use with the specific computer system embodiments described herein, but rather, the processes can be utilized independently and separately from other processes described herein. Moreover, the invention is not limited to the embodiments of the processes and systems described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:

1. A method for determining user liveness comprising the steps of:
   capturing, by one of a plurality of illumination devices, image data of a biometric modality of a user while any combination of the illumination devices is operated across different wavelengths and at different times to apply illumination to the biometric modality, the illumination devices being located at different positions relative to the biometric modality;
   transmitting via the network, by the one illumination device, the captured image data to a computer;
   recognizing reflections in the captured image data, the reflections resulting from the applied illumination; and
   determining the captured image data was taken of a live person based on the reflections.

2. The method according to claim 1, further comprising the step of detecting a pattern in the reflections, the pattern being included in the applied illumination.

3. The method according to claim 1, wherein the illumination devices comprise at least a smart device and a lamp.

4. The method according to claim 1, further comprising the step of tracking the applied illumination on the biometric modality.

5. The method according to claim 1, further comprising the steps of:
   detecting a pattern in the reflections, the pattern being included in the applied illumination; and
   tracking the pattern on the biometric modality.

6. A computer for determining user liveness comprising:
   a processor; and
   a memory configured to store data, said authentication computer system being associated with a network and said memory being in communication with said processor and having instructions stored thereon which, when read and executed by said processor, cause said authentication computer system to:

receive image data of a biometric modality of a user captured by one of a plurality of illumination devices while any combination of the illumination devices was operated across different wavelengths and at different times to apply illumination to the biometric modality, the illumination devices being located at different positions relative to the biometric modality;

recognize reflections in the captured image data, the reflections resulting from the applied illumination; and determine the captured image data was taken of a live person based on the reflections.

7. The computer according to claim 6, wherein the instructions when executed by the processor further cause said authentication computer system to detect a pattern in the reflections, the pattern being included in the applied illumination.

8. The computer according to claim 6, wherein the instructions when executed by the processor further cause said authentication computer system to track the applied illumination on the biometric modality.

9. The computer according to claim 6, wherein the instructions when executed by the processor further cause said authentication computer system to:

detect a pattern in the reflections, the pattern being included in the applied illumination; and track the pattern on the biometric modality.

10. A non-transitory computer-readable recording medium in a computer for determining user liveness, the non-transitory computer-readable recording medium storing instructions which when executed by a hardware processor cause the non-transitory recording medium to perform steps comprising:

receiving image data of a biometric modality of a user captured by one of a plurality of illumination devices while any combination of the illumination devices was operated across different wavelengths and at different times to apply illumination to the biometric modality, the illumination devices being located at different positions relative to the biometric modality;

recognizing reflections in the captured image data, the reflections resulting from the applied illumination; and determining the captured image data was taken of a live person based on the reflections.

11. The non-transitory computer-readable recording medium according to claim 10, further comprising detecting a pattern in the reflections, the pattern being included in the applied illumination.

12. The non-transitory computer-readable recording medium according to claim 10, further comprising tracking the applied illumination on the biometric modality.

* * * * *